Figure 1:
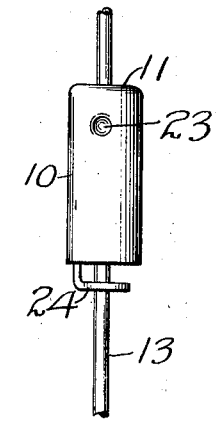

R. FISCHER.
SCARF PIN HOLDER.
APPLICATION FILED DEC. 10, 1909.

963,537.

Patented July 5, 1910.

WITNESSES:
Geo. A. Senior
W. S. McDowell.

INVENTOR,
Robert Fischer,
BY Victor J. Evans.
ATTORNEY

UNITED STATES PATENT OFFICE.

ROBERT FISCHER, OF BROOKLYN, NEW YORK.

SCARF-PIN HOLDER.

963,537.  Specification of Letters Patent.  Patented July 5, 1910.

Application filed December 10, 1909. Serial No. 532,473. REISSUED

*To all whom it may concern:*

Be it known that I, ROBERT FISCHER, a citizen of the United States, residing at Brooklyn, in the county of Kings and State of New York, have invented new and useful Improvements in Scarf-Pin Holders, of which the following is a specification.

Figure 2:
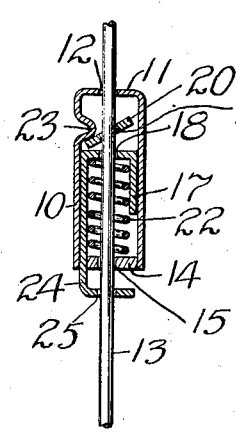
Figure 3:
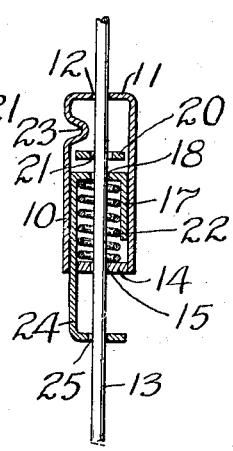
Figure 4:
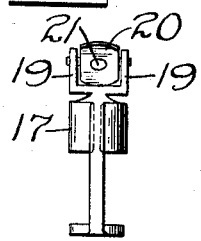
Figure 5:
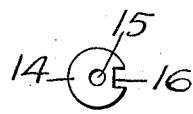
Figure 6:
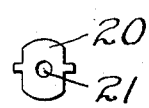
Figure 7:
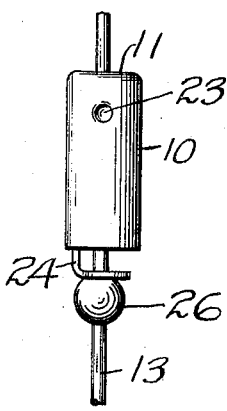

This invention relates to scarf pin holders and its object is to provide an obstruction to be secured to the end of the scarf pin to prevent its removal after once being placed in position on the scarf, but which can be readily removed when desired, as will be more fully explained in the following specification, set forth in the claims and illustrated in the drawings, wherein:

Figure 1 is an elevation of the holder. Fig. 2 is a sectional view of same. Fig. 3 shows a similar view with the pin released. Fig. 4 is a detail view of the clutch mechanism. Fig. 5 is a washer filling the lower end of the holder. Fig. 6 is the clutch. Fig. 7 is a modified form.

The holder consists of a thimble 10 preferably stamped of sheet metal and having its upper end 11 closed and in which is a perforation 12 for the passage of the pin 13. The lower end of the thimble is closed by means of the washer 14 having the perforation 15 and the slot 16.

Within the thimble is carried a slide frame 17 having at its upper end a perforation 18 and ears 19 and in the latter is journaled a clutch 20 having a perforation 21 with sharp edges which are adapted to engage and hold the pin 13 when set at an angle as shown in Fig. 2, but when the clutch is turned to a horizontal position as shown in Fig. 3, the pin 13 is free to pass through same.

Beneath frame 17 and between it and the washer 14 is a spring 22 which forces the frame 17 and the clutch 20 upward causing the latter to come in contact with the projection 23 struck in one side of the thimble 10 and which throws the clutch 20 at an angle to cause the edges of the perforation 21 to bite and retain the pin.

When it is desired to loosen the pin by changing the position of the clutch 20, the frame 17 is pulled downward by means of a tail 24 which extends through the slot 16 and whose lower end is provided with a perforation 25 through which the pin is adapted to pass.

The drawings show the invention on a greatly enlarged scale and in practice the tail 24 is operated by the finger nail of the user but may be found desirable to employ a ball 26 such as shown in Fig. 7 by which the frame 17 may be manipulated.

The device is simple and efficient in operation and its parts may be stamped from sheet metal and assembled at a small cost. It may be used to secure scarf pins, hat pins and other similar articles by simply passing the pin through the various perforations shown in the drawings and the spring 22 renders the device automatic as it operates the slide to throw the clutch in the position to grasp the pin.

It is obvious that the parts may be otherwise arranged or modified without departing from the essential features above described.

What I claim as new and desire to secure by Letters Patent is:

1. In a pin holder, the combination with a thimble having a projection, of a movable frame therein, a perforated clutch carried by the frame and adapted to be operated by the projection, and a spring adapted to cause the clutch to come in contact with the projection.

2. In a pin holder, the combination with a thimble having perforated ends, of a frame sliding in the thimble, a spring interposed between the frame and the bottom of the thimble, and a pivoted perforated plate carried by the frame and adapted to assume its operative position when in contact with the projection.

In testimony whereof I affix my signature in presence of two witnesses.

ROBERT FISCHER.

Witnesses:
ROBERT R. HUGHES,
THEODORE FRITSCH.